(12) United States Patent
Curtis

(10) Patent No.: US 8,073,812 B2
(45) Date of Patent: Dec. 6, 2011

(54) PRESERVING USER INTENTION IN DISTRIBUTED DATA SYSTEMS

(75) Inventor: Pavel Curtis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 12/252,254

(22) Filed: Oct. 15, 2008

(65) Prior Publication Data

US 2010/0094912 A1  Apr. 15, 2010

(51) Int. Cl.
*G06F 17/00* (2006.01)

(52) U.S. Cl. ........ 707/614; 707/610; 707/640; 707/687; 707/802; 706/45; 706/62; 717/168

(58) Field of Classification Search .................. None
See application file for complete search history.

(56) References Cited

U.S. PATENT DOCUMENTS

| | | | |
|---|---|---|---|
| 5,781,908 | A | 7/1998 | Williams et al. |
| 5,940,082 | A * | 8/1999 | Brinegar et al. ............. 345/442 |
| 6,342,906 | B1 | 1/2002 | Kumar et al. |
| 6,529,905 | B1 * | 3/2003 | Bray et al. ............................ 1/1 |
| 6,614,430 | B1 | 9/2003 | Rappoport |
| 7,127,501 | B1 | 10/2006 | Beir et al. |
| 7,912,811 | B2 * | 3/2011 | Hodel-Widmer ............. 707/608 |
| 2002/0056003 | A1 | 5/2002 | Goswami |
| 2004/0085355 | A1 | 5/2004 | Harmes et al. |
| 2006/0053194 | A1 | 3/2006 | Schneider et al. |
| 2006/0184673 | A1 | 8/2006 | Liebman |
| 2006/0200755 | A1 | 9/2006 | Melmon et al. |
| 2008/0059539 | A1 | 3/2008 | Chin et al. |
| 2008/0072141 | A1 | 3/2008 | Hodel-Widmer |
| 2008/0172607 | A1 * | 7/2008 | Baer ............................. 715/255 |

OTHER PUBLICATIONS

Sun et al, "A generic operation transformation scheme for consistency maintenance in real-time cooperative systems", ACM, 1997.*
Ellis et al, "Concurrency Control in Groupware Systems", ACM, 1989.*
Sun et al, "An Intention preserving transfomration algorithm for operations in cooperative text editing systems", In Proc, of the Third International Conference on Concureent Engineering, 1996.*
Sun et al, "Distributed synchronization of group operations in cooperative editing environments", School of Computing & Information Technology, Griffith University, Australia, 1995.*
Sun et al, "A consistency model and supporting schemes for real-time cooperative editing systems", School of Computing & Information Technology, Griffith University, Australia, 1996.*
Sun, Chengzhen, et al., "Reduce: a prototypical cooperative editing system", Proceedings of the Seventh International Conference on Human-Computer Interaction-vol. 1, pp. 89-92 Year of Publication: 1997.

(Continued)

*Primary Examiner* — Apu Mofiz
*Assistant Examiner* — Hung Le
(74) *Attorney, Agent, or Firm* — Workman Nydegger

(57) ABSTRACT

The present invention extends to methods, systems, and computer program products for preserving user intention in distributed data systems. Embodiments of the invention preserve user intention when different copies of the same data are independently edited at different locations. User intent can be preserved without centralized locking or other coordination. Thus, modifications to each copy of the date are appropriately reflected in all other copies of the data such that all copies end up in essentially the same state. Embodiments of the invention can be used in collaborative editing and data replication systems.

20 Claims, 9 Drawing Sheets

OTHER PUBLICATIONS

Sun, C., et al., "Distributed Concurrency Control in Real-time Cooperative Editing Systems", Appeared in the Proc. of Asian Computing Science Conference, LNCS, #1179, Springer-Verlag, Singapore, pp. 84-95, Dec. 1996.

Sun, Chengzheng, et al., "Achieving Convergence, Causality-preservation, and Intention-preservation in Real-time Cooperative Editing Systems", ACM Transactions on Computer-Human Interaction (TOCHI) vol. 5, Issue 1 (Mar. 1998) pp. 63-108 Year of Publication: 1998.

* cited by examiner

FIG. 2D

PRESERVING USER INTENTION IN DISTRIBUTED DATA SYSTEMS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, such as, for example, data-replication and collaborative-editing systems, there are multiple copies of the same data (e.g., a document) at multiple sites (e.g., different user's computer systems). As such, users at different sites can make different changes to their (local) copy of the data. Various updating techniques can then be used to propagate changes from each copy to all the other copies such that all copies reflect changes made at each other copy. The updating techniques attempt to preserve the intent of each user that made changes to a copy of the data.

For example, it may be that a first user edits line 10 of a copy of a document and a second user edits line 20 of a copy of the document. The updating techniques can then propagate the edit to line 10 can to the second user's copy of the document and can propagate the edit to line 20 to the first user's copy of the document. Thus, both copies of the document reflect the edit to line 10 and the edit to line 20. Accordingly, both copies of the document also appropriately reflect the intent of both the first user and the second user.

However, current updating techniques often have difficulty preserving user intention when multiple users change overlapping portions of data or changes otherwise conflict. For example, the initial state of a document may be "XYZ". First, second and third users can edit local copies of the document, without knowledge of the edits made by other users. The first user can insert '1' before 'Y', the second user can insert '2' before 'Z', and the third user can delete 'Y'. Thus, preserving all three user intentions, means ending up with the state "X12Z". However, typical systems implement such edits as concrete edits. In such systems, they represent the three user intentions above as the following concrete edits: First user: insert '1' before the second character, Second user: insert '2' before the third character, and Third user: delete the second character. Depending on the order in which edits arrive at some fourth site, existing systems can sometimes yield the incorrect final state "X21Z".

As such, suppose the fourth user receives the third user's edit first, so they apply his edit unchanged, ending up in state 'XZ'. Next comes the second user's edit, which must be transformed to account for the third user's edit. They correctly note that, since the third user's edit removed a character to the left of the "third character" mentioned in the second user's edit, they must transform the second user's original edit into the derived edit "insert '2' before the second character". They thus end up, correctly, in state "X2Z".

Finally the first user's edit arrives, which must be transformed to account for both the second user's edit and the third user's edit. First, they deal with the third user's edit and decide, again correctly, that no actual transformation of the first user's edit is necessary, since the third user's edit didn't change anything to the left of the "second character" mentioned in the first user's edit. Next, to deal with the second user's edit, they correctly compare the first user's edit with the derived version of the second user's edit, since both of those edits have already taken the third user's edit into account. The second user's derived edit inserts a character to the left of the "second character" mentioned in the first user's edit, so they (seemingly correctly, but really wrongly) transform the first user's edit into the derived edit "insert '1' before the third character". They thus end up, incorrectly, in state "X21Z".

Unfortunately, current updating techniques do not adequately represent or take into account the original intentions behind the users' concrete edits. Thus, there is essentially no way to preserve the intent of the first and second user's changes with any degree of confidence.

Difficulties with current updating techniques can be significantly compounded as the number of users changing data increases. The chance of two changes conflicting increases as more users enter data changes. Further there is always some chance that the edits of three or more users will conflict with one another. For example, when a first user, second user, third user, etc. all edit overlapping portions of data within their copy of the data.

BRIEF SUMMARY

The present invention extends to methods, systems, and computer program products for preserving user intention in distributed data systems. A computer system receives a first concrete edit operation. The first concrete edit operation having originally been applied to a first instance of the model when the first instance of the model was in a specified state. The combination of the first concrete edit operation as applied to the first instance of the model in the specified state representing a first semantic edit operation to the model. The computer system applies the received first concrete edit operation to a local instance of the model at the computer system to edit the local instance of the model.

The computer system receives a second concrete edit operation from another computer system subsequent to applying the first concrete edit operation to the local instance of the model. The second concrete edit operation having originally been applied to a second instance of the model when the second instance of the model was in a state that lacked knowledge of the first edit. The combination of the second concrete edit operation as applied to the second instance of the model in the state corresponding without knowledge of the first edit representing a second semantic edit operation to the model.

The position of the first semantic edit operation relative to the position of the second semantic edit operation in a global ordering of semantic edit operations for collaboratively editing the model is determined. The received second concrete edit is appropriately transformed into a derived second concrete edit operation to apply to the local instance of model at the computer system. The transformation is based on the determined position of the first semantic edit operation relative to the position of the second semantic edit operation in a global ordering.

The computer system applies the derived second concrete edit operation to the local instance of the model to appropriately reflect the collaborative editing of the model in accordance with the global ordering of semantic operations. Accordingly, the likelihood of the received first and second concrete edit operations causing the local instance of the model to transition into the same state as instances of the model at the one or more other computer systems is increased.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A-2D illustrate data processing examples of preserving user intention in a distributed data system.

DETAILED DESCRIPTION

Figure 1A:
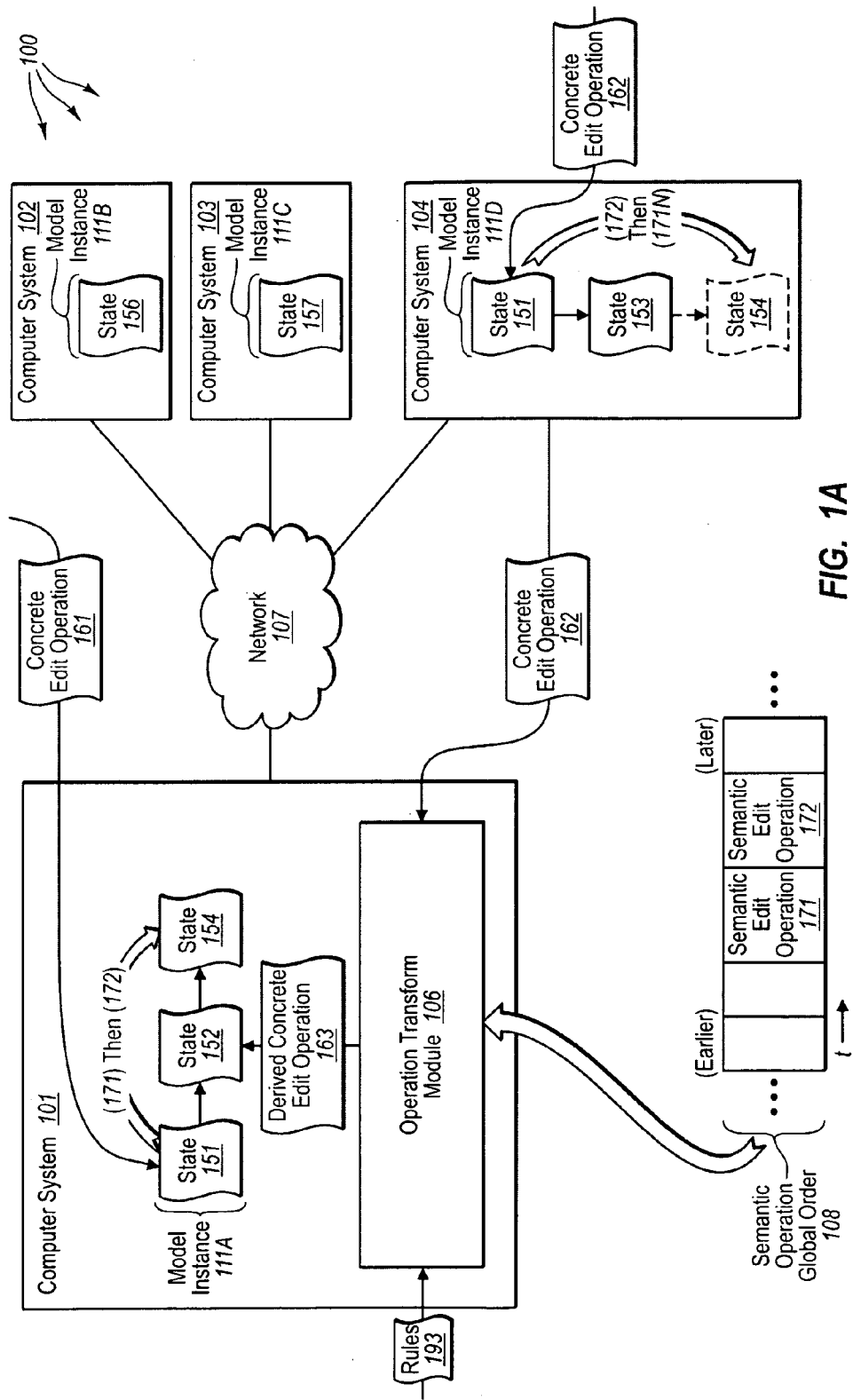
FIGS. 1A-1D illustrate an example computer architecture that facilitates preserving user intention in a distributed data system.

The present invention extends to methods, systems, and computer program products for preserving user intention in distributed data systems. A computer system receives a first concrete edit operation. The first concrete edit operation having originally been applied to a first instance of the model when the first instance of the model was in a specified state. The combination of the first concrete edit operation as applied to the first instance of the model in the specified state representing a first semantic edit operation to the model. The computer system applies the received first concrete edit operation to a local instance of the model at the computer system to edit the local instance of the model.

The computer system receives a second concrete edit operation from another computer system subsequent to applying the first concrete edit operation to the local instance of the model. The second concrete edit operation having originally been applied to a second instance of the model when the second instance of the model was in a state that lacked knowledge of the first edit. The combination of the second concrete edit operation as applied to the second instance of the model in the state corresponding without knowledge of the first edit representing a second semantic edit operation to the model.

The position of the first semantic edit operation relative to the position of the second semantic edit operation in a global ordering of semantic edit operations for collaboratively editing the model is determined. The received second concrete edit is appropriately transformed into a derived second concrete edit operation to apply to the local instance of model at the computer system. The transformation is based on the determined position of the first semantic edit operation relative to the position of the second semantic edit operation in a global ordering.

The computer system applies the derived second concrete edit operation to the local instance of the model to appropriately reflect the collaborative editing of the model in accordance with the global ordering of semantic operations. Accordingly, the likelihood of the received first and second concrete edit operations causing the local instance of the model to transition into the same state as instances of the model at the one or more other computer systems is increased.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and in the following claims, a "semantic edit operation" is defined as a representation of a user's intent with respect to editing a model. For example, a user's intent to delete the word "dog" from the sentence "the dog jumped over the box" is a semantic edit operation.

Within this description and in the following claims, a "concrete edit operation" is defined as lower level edit operation for actual implementation against a model. For example, a command to delete the characters in positions 5-7 inclusive from the sentence "the cat ran into the bucket" is a concrete edit operation.

Generally, a concrete edit operation models a semantic edit operation for a specified model state. That is, based on the state of a model, there is a concrete edit operation that, when applied to the model, results in implementing the user intent of a corresponding semantic operation. For example, a user may intend to delete the word "jumped" from the following sentence "the dog jumped over the box". Within that state of the sentence (i.e., the characters as currently arranged), applying a concrete edit operation to remove character positions 9-15 inclusive results in implementing the user's intent to delete the word "jumped" as indicated in the semantic edit operation. Thus, when a model is in specified state, a semantic edit operation can be transformed into a concrete edit operation to realize a user's intent.

On the other hand, if the state of sentence changes to: "the brown dog jumped over the box" (a different state of the sentence, for example, resulting from an intervening concrete edit operation), the concrete edit operation described above does not result in implementing the user's intent to delete the word "jumped" as indicated in the semantic operation. Instead, application of the concrete operation would result in the sentence "the brownmped over the box".

Pre-defined operation transform rules can be used to convert between concrete edit operations. Pre-defined operation transform rules can take two concrete edit operations, for example, A and B, as input. Concrete edit operations A and B can be created with knowledge of the same set of earlier concrete edits. Concrete edit A can be an edit that has not yet been applied to the local copy of a model. Concrete edit B can be an edit that has already been applied to the local copy of the model. From concrete edits A and B, the pre-defined operation-transformation rules can produce as output a derived concrete edit operation A'.

Suppose that concrete edit A, when applied in the state in which it was created, represents semantic edit operation SemA, and that concrete edit B, when applied in the state in which it was created, represents semantic edit operation SemB. Pre-defined operation-transform rules can be configured to determine how to convert a received concrete operation into a new concrete operation to preserve user intentions. Accordingly, pre-defined operation-transformation rules fall into two categories, depending on whether SemA precedes or follows SemB in the global order. When a concrete edit is received, an operation-transformation module applies operation-transformation rules from the category appropriate to the actual situation at hand.

For example, when SemA precedes SemB in the global order, the derived concrete edit A' should represent, in the state after edit B has been applied, some derived semantic edit operation SemA' such that SemA;SemB=SemB;SemA'. On the other hand, when SemA follows SemB in the global order, the derived concrete edit A' should represent SemA in the state after edit B has been applied.

An author of operation-transformation rules can craft the operation-transform rules to implicitly produce new concrete edit operations that represent appropriate semantic edit operations. For example, an author can configure operation-transformation rules to ensure that the forgoing two properties hold for those rules.

FIGS. 1A-1D illustrate an example computer architecture 100 that facilitates preserving user intention in a distributed data system. Referring to FIG. 1, computer architecture 100 includes computer system 101, computer system 102, computer system 103, and computer system 104. Each of the depicted computer systems is connected to one another over (or is part of) network 107, such as, for example, a Local Area Network ("LAN"), a Wide Area Network ("WAN"), and even the Internet. One or more other computer systems (not shown) can also be connected to network 107. Accordingly, each of the depicted computer systems as, well as any other connected computer systems, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

For example, computer systems 101, 102, 103 and 104, as well as any other connected computer systems, can exchange message related data related to collaboratively editing model 111. As depicted, each of computers is editing an instance of model 111. Computer systems 101, 102, 103 and 104 are editing model instances 111A, 111B, 111C, and 111D respectively.

Each model instance can be in a specified state based on edit operations applied to the model instance. For example, model instances 111A and 111D are in state 151, model instance 111B is in state 156, and model 111C is state 157.

Generally, edits to an instance of model 111 generated at one computer system are propagated out to other computer systems participating in collaborative editing of model 111. For example, concrete edit operation 162 can be received at computer system 104 and eventually propagated to computer system 101 (and computer systems 102 and 103).

A semantic operation global order can be deterministically computed at any computer system collaboratively editing model 111. The semantic global ordering can be determined in isolation without reference to other computer systems. The semantic global ordering respects causality. That is, if one semantic edit operation is made with knowledge of another semantic edit operation, the one semantic edit operation is indicated as coming after the other edit operation. If, based on causality, a global semantic ordering is indeterminate, reference to a local clock (e.g., maintaining Greenwich Mean Time) can be used. If, based on reference to an external clock, a global semantic ordering is indeterminate, semantic edit operations can be sorted by computer system ID.

Generally, although semantic edit operations are ordered according to a semantic operation global ordering, the application of concrete edit operations changes the state of a model instance. Thus, even when concrete edit operations are received in an order corresponding the semantic operation global ordering, direct application of the concrete edit operations may not result in preservation of user intention. As such, some concrete edit operations can be transformed prior to application to preserve user intent. That is, a different concrete edit operation can be derived to represent a semantic edit operation based on a change in state of a model instance.

Additionally, when concrete edits are received in an order that, if applied in the received order, is not in accordance with semantic operation global ordering, indicated semantic edit operations may not result in preservation of user intention. As such, appropriate semantic edit operations can be identified to replace indicated semantic edit operations to preserve user intent. A concrete edit operation can then be derived for the identified semantic edit operation based on the state of a model instance.

Accordingly, each computer system collaboratively editing model 111 can include an operation transform module. For example, computer system 101 includes operation transform module 106. Operation transform module 106 can process operation-transformation rules (hereinafter referred to simply as "rules") to convert one concrete operation to another concrete operation. Rules can represent an understanding of semantic operations and semantic operation conversions used to appropriately convert one concrete operation into another concrete operation.

Rules can be generalized or can be for a specified model type. For example, rules can define how to transform concrete edit operations for character strings, property bags, tree structures, etc.

Accordingly, as depicted in computer architecture 100, rules 193 can include pre-defined rules and/or policy defining how to transform concrete edit operations for the model type of model 111.

FIGS. 2A-2D illustrate data processing examples of preserving user intention in a distributed data system corresponding to the example computer 100 architectures 100 from FIGS. 1A-1D respectively. That is, the data processing example in FIG. 2A corresponds to computer architecture 100 of FIG. 1A, the data processing example in FIG. 2B corresponds to computer architecture 100 of FIG. 1B, the data processing example in FIG. 2C corresponds to computer architecture 100 of FIG. 1C, and the data processing example in FIG. 2D corresponds to computer architecture 100 of FIG. 1D.

Figure 3:
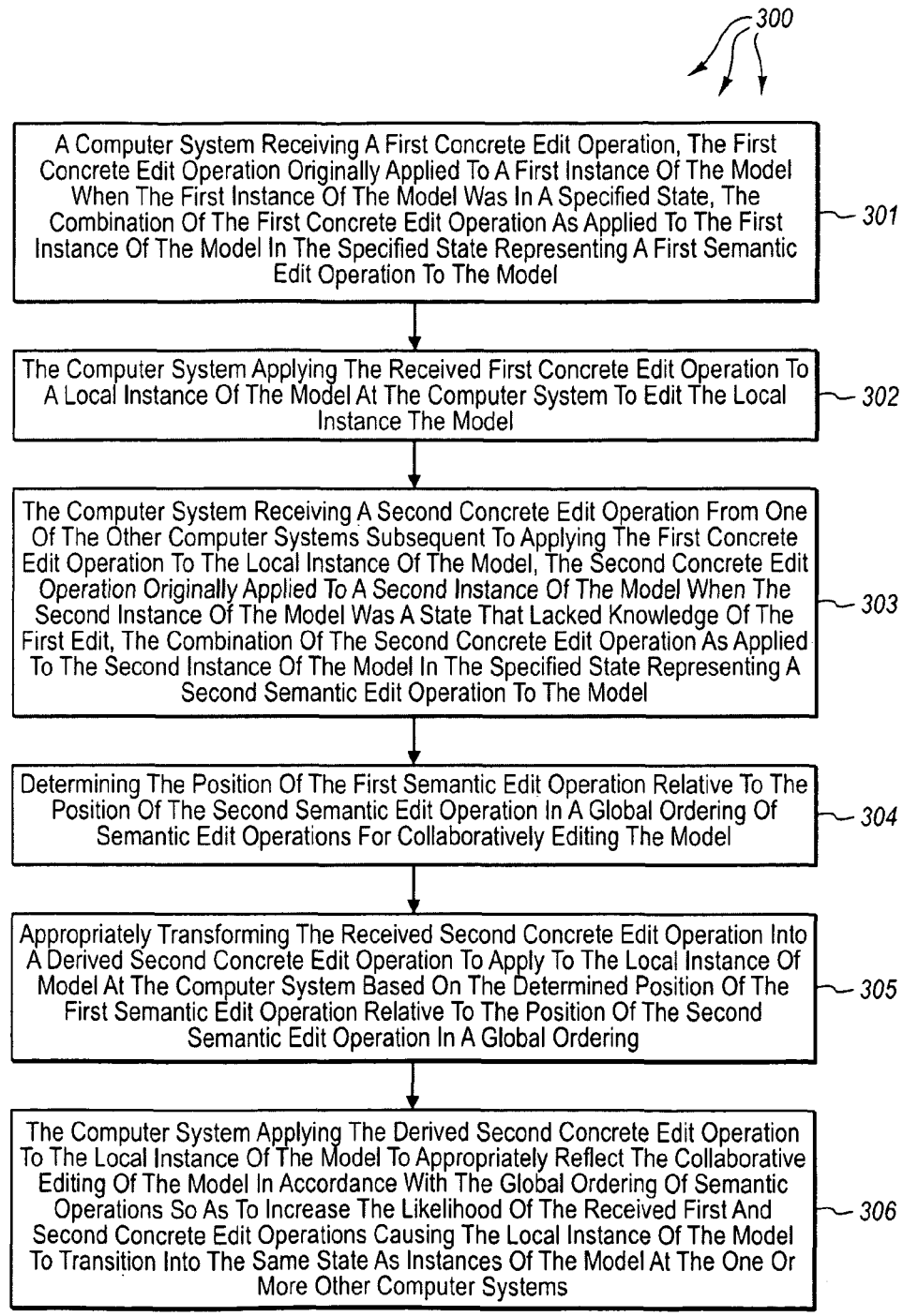
FIG. 3 is a flow chart of an example method for preserving user intention in a distributed data system.

FIG. 3 illustrates a flow chart of an example method 300 for preserving user intention in a distributed data system. In turn, method 300 will be described with respect to the components and data in each of FIGS. 1A-1D and corresponding data processing examples 2A-2D respectively.

Figure 2A:
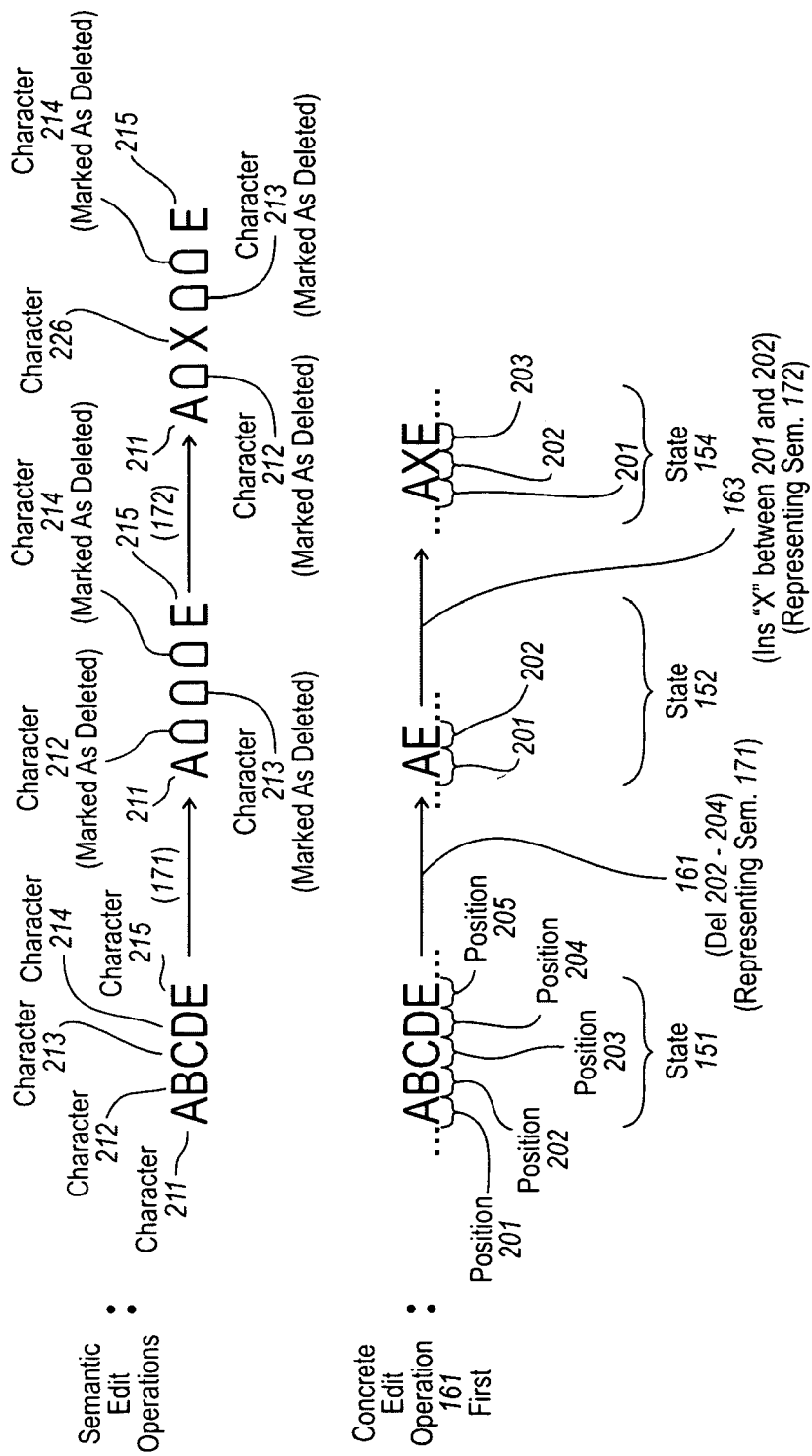

FIGS. 1A and 2A represent a first example of the received order of concrete operations in accordance with a semantic operation global order. Accordingly, referring to FIGS. 1A and 2A, method 300 includes an act of a computer system receiving a first concrete edit operation, the first concrete edit operation originally applied to a first instance of the model when the first instance of the model was in a specified state, the combination of the first concrete edit operation as applied to the first instance of the model in the specified state representing a first semantic edit operation to the model (act 301). For example, computer system 101 can receive concrete edit operation 161. Concrete edit operation 161 can have originally been applied at a computer system participating in the collaborative editing of model 111. Concrete edit operation 161 can have been applied to an instance of model 111 when the instance of model 111 was in state 151. The application of concrete edit 161 to state 151 of the model instance represents semantic edit 171.

Method 300 includes an act of the computer system applying the received first concrete edit operation to a local instance of the model at the computer system to edit the local instance the model (act 302). For example, computer system 101 can apply concrete edit 161 to model instance 111A to edit model instance 111A. Application of concrete edit operation 161 causes model instance 111A to transition to state 152. Application of concrete edit operation 161 to model instance 111A also represents the application of semantic edit 171 to model instance 111A (since model 111A was in state 151 when concrete edit 161 was applied).

Referring to FIG. 2A, model instances 111A and 111B can equal "ABCDE" in state 151. Semantic edit operation 171 can be to "Delete from character 212 through character 214 inclusive" and semantic edit operation 172 can be to "Insert 'X' before 'character 213'". Thus, semantic edit operation 171 followed by semantic operation 172 results in "AXE".

With respect to semantic operations, each character of model instance 111A can be individually identified using a unique identifier. Character 211 represents 'A', character 212 represents 'B', character 213 represents 'C', character 214 represents 'D', and character 215 represents 'E'. Semantic operation 171 indicates that characters 212, through 214 inclusive are to be deleted. Semantic operation 172 indicates that "X" is to be inserted before character 213. Thus, semantic operation 171 causes characters 212, 213, and 214 to be "marked as deleted".

With respect to semantic operations, a tombstone can be used to maintain positions for characters that are marked as deleted. A tombstone can also retain an indication of the represented data. For example, a tombstone can indicate that character 213 (marked as deleted) is a 'C'. Thus, in some embodiments, with respect to semantic operations, a character is represented as a triple {char c, GUID id, bool isDeleted}. Accordingly, with respect to semantic operations a string can be represented as a sequence of triples.

On the other hand with respect to concrete operations, each character of model instance 111A can be identified by reference to its position within a grouping of data (e.g., an index to a file). For example, ABCDE are at positions 201-205 respectively. Concrete edit operation 161 indicates that character positions 202 through 204 are to be deleted. Computer system 101 can apply concrete edit operation 161 to delete 'B', 'C', and 'D' (the characters in character positions 202 through 204). The application of concrete edit operation 161 causes model 111A to transition to state 152, including "A" at position 201 and "E" at position 202.

Method 300 includes an act of the computer system receiving a second concrete edit operation from one of the other computer systems subsequent to applying the first concrete edit operation to the local instance of the model, the second concrete edit operation originally applied to a second instance of the model when the second instance of the model was a state that lacked knowledge of the first edit, the combination of the second concrete edit operation as applied to the second instance of the model in the specified state representing a second semantic edit operation to the model (act 303). For example, computer system 101 can receive concrete edit operation 162 from computer system 104 subsequent to applying concrete edit 161 to model instance 111A. Concrete edit operation 162 was originally applied to model instance 111B when model 111B was in state 151 (and thus lacked knowledge of concrete edit operation 161). Application of concrete edit 162 to model instance 111B represents application of semantic edit 172 to model instance 111B (since model 111B was in state 151 when concrete edit 162 was applied).

Method 300 includes an act of determining the position of the first semantic edit operation relative to the position of the second semantic edit operation in a global ordering of semantic edit operations for collaboratively editing the model (act 304). For example, computer system 101 can determine that semantic edit operation 171 is before semantic edit operation 172 in semantic operation global order 108.

Method 300 includes an act of appropriately transforming the received second concrete edit operation into a derived second concrete edit operation to apply to the local instance of model at the computer system based on the determined position of the first semantic edit operation relative to the position of the second semantic edit operation in a global ordering (act 305). For example, operation transform module 106 can follow rules 193 to derive concrete edit operation 163 to apply to model instance 111A. Rules 193 can reflect an understanding that the application of concrete edit operation 161 to model instance 111A (in state 151) represents semantic edit operation 171. Rules 193 can then refer to semantic operation global order 108 to determine that semantic edit operation 172 follows semantic operation 171.

Method 300 includes an act of the computer system applying the derived second concrete edit operation to the local instance of the model to appropriately reflect the collaborative editing of the model in accordance with the global ordering of semantic operations so as to increase the likelihood of the received first and second concrete edit operations causing the local instance of the model to transition into the same state as instances of the model at the one or more other computer systems (act 306). For example, computer system 101 can apply derived concrete edit operation 163 to model instance 111A in state 152. Application of derived concrete edit operation 163 causes model instance 111A to transition to state 154. Application of derived concrete edit operation 163 also appropriately reflects the collaborative editing of model 111 in accordance with semantic operation global ordering 108. Adhering to semantic operation global ordering 108 increases the likelihood of the received concrete edit operations 161 and 162 causing model instance 111A to transition into the same state as instances of the model at the one or more other computer systems. For example, computer system 101 and 104 both transition to state 154.

Referring again to FIG. 2A, semantic operation 172 indicates that "X" is to be inserted before character 213. Representing subsequent application of semantic operation 172 would cause "X" to be between inserted before character 213 (marked as deleted). Thus, semantic edit operation 171 followed by semantic edit operation 172 results in "AXE".

Derived concrete edit operation 163 can indicate that 'X' is to be inserted between positions 201 and 202. Computer system 101 can apply concrete edit operation 161 to insert 'X' between positions 201 and 202. The application of derived concrete edit operation 163 causes model 111A to transition to state 154, including 'A' at position 201, 'X' at position 202, and 'E' at position 203.

Figure 1B:
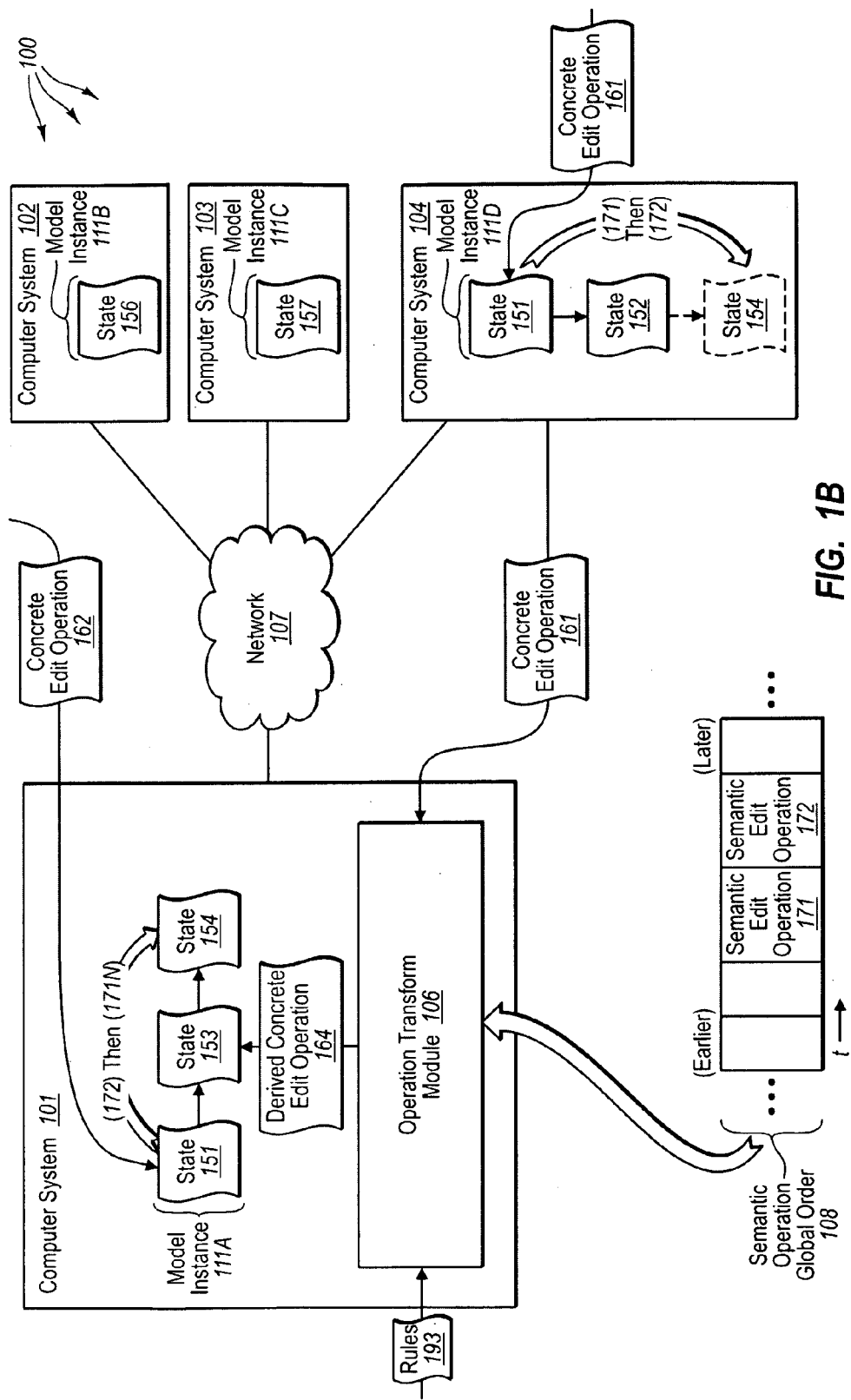
Figure 2B:
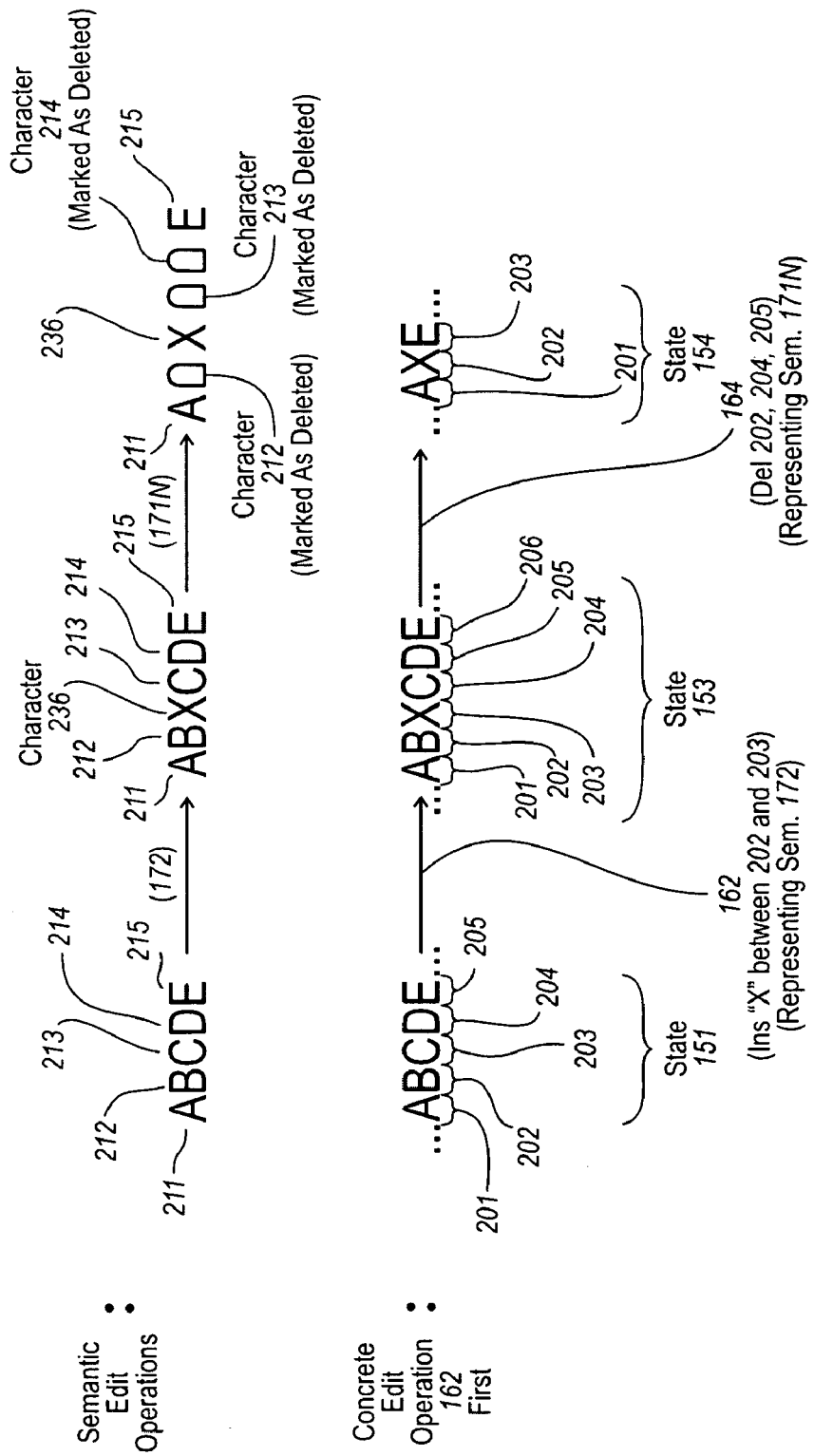

FIGS. 1B and 2B represent a first example of the received order of concrete operations not in accordance with a semantic operation global order. Referring now to FIGS. 1B and 2B, computer system can receive concrete edit operation 162 prior to receiving concrete edit operation 161. Concrete edit operation 162 can have originally been applied at a computer system participating in the collaborative editing of model 111. Concrete edit operation 162 can have been applied to an instance of model 111 when the instance of model 111 was in state 151. The application of concrete edit 162 to state 151 of the model instance represents semantic edit 172.

Computer system 101 can apply concrete edit 162 to model instance 111A to edit model instance 111A. Application of concrete edit operation 162 causes model instance 111A to transition to state 153. Application of concrete edit operation 162 to model instance 111A also represents the application of semantic edit 172 to model instance 111A (since model 111A was in state 151 when concrete edit 162 was applied).

Referring to FIG. 2B, model instance 111A and 111B can equal "ABCDE" in state 151. Semantic operation 171 indicates that characters 212 through 214 inclusive are to be deleted. Semantic operation 172 indicates that "X" is to be inserted before character 213. Thus, semantic operation 172 causes character 236 'X' to be inserted before character 213 'C'.

Concrete edit operation 162 can indicate that 'X' is to be inserted between positions 202 and 203. Computer system 101 can apply concrete edit operation 162 to insert 'X' between positions 202 and 203. 'X' assumes position 203, and 'C', 'D', and 'E' are moved to the positions 204, 205, and 206 respectively. Thus, application of concrete edit operation 162 causes model 111A to transition to state 153, "ABXCDE".

Computer system 101 can receive concrete edit operation 161 from computer system 104 subsequent to applying concrete edit 162 to model instance 111A. Concrete edit operation 161 was originally applied to model instance 111B when model 111B was in state 151 (and thus lacked knowledge of concrete edit operation 162). Application of concrete edit 161 to model instance 111B represents application of semantic edit 171 to model instance 111B (since model 111B was in state 151 when concrete edit 161 was applied).

Computer system 101 can determine that semantic edit operation 171 is before semantic edit operation 172 in semantic operation global order 108. However, the application of concrete edit operation 162 to model instance 111A (in state 151) represents that semantic edit operation 172 was already applied. Accordingly, rules 193 can implicitly reflect the identification of an appropriate semantic edit operation to compensate for the prior application of concrete edit operation 162. For example, rules 193 can identify semantic operation 171N. Semantic operation 171N can have properties such that 172;171N=171;172. Thus, semantic edit operation 172 followed by semantic edit operation 171N also causes "ABCDE" to become "AXE".

Rules 193 can utilize virtually any level of reasoning that can be represented in code or other executable instructions to implicitly or expressly identify semantic operation 171N. For example, rules 193 can include one or more of: heuristic algorithms, artificial intelligence, and expert systems to identify a semantic edit operation having the properties of semantic edit operation 171N. Rules 193 can then be followed to transform concrete edit operation 161 to derive concrete edit operation 164 representing semantic edit operation 171N.

Computer system 101 can then apply derived concrete edit operation 164 to model instance 111A in state 153. Application of derived concrete edit operation 164 causes model instance 111A to transition to state 154. Application of derived concrete edit operation 164 also appropriately reflects the collaborative editing of model 111 in accordance with semantic operation global ordering 108. Adhering to semantic operation global ordering 108 increases the likelihood of the received concrete edit operations 162 and 161 causing model instance 111A to transition into the same state as instances of the model at the one or more other computer systems. For example, computer system 101 and 104 both transition to state 154.

Referring again to FIG. 2B, semantic operation 171N can indicate that characters 212, 213, and 214 are to be deleted (different from deleting characters 212-214 inclusive, which would also include deleting character 236). Thus, semantic operation 171N causes characters 212, 213, and 214 to be "marked as deleted". Accordingly, semantic edit operation 172 followed by semantic edit operation 171N results in "AXE".

Derived concrete edit operation 164 can indicate that character positions 202, 204, and 205 are to be deleted. Computer system 101 can apply derived concrete edit operation 164 to delete 'B', 'C', and 'D' (the characters in character positions 202, 204, and 205). Thus, application of derived concrete edit operation 164 causes model 111A to transition to state 154, including "A" at position 201, 'X' at position 202, and 'E' at position 203.

Accordingly, state 154 is reached in FIGS. 2A and 2B, whether concrete edit operation 161 or concrete edit operation 162 is applied first. Thus, embodiments of the invention increase the likelihood of preserving user intention even when concrete edit operations are initially applied in different orders at different computer systems. For example, referring to FIG. 1A (or FIG. 1B), computer systems 101 and 104 both eventually reach state 154, whether concrete edit operation 161 or 162 is applied first. Thus, the intention of users that performed concrete edit operations 161 and 162 locally is preserved at computer systems 101 and 104.

Figure 1C:
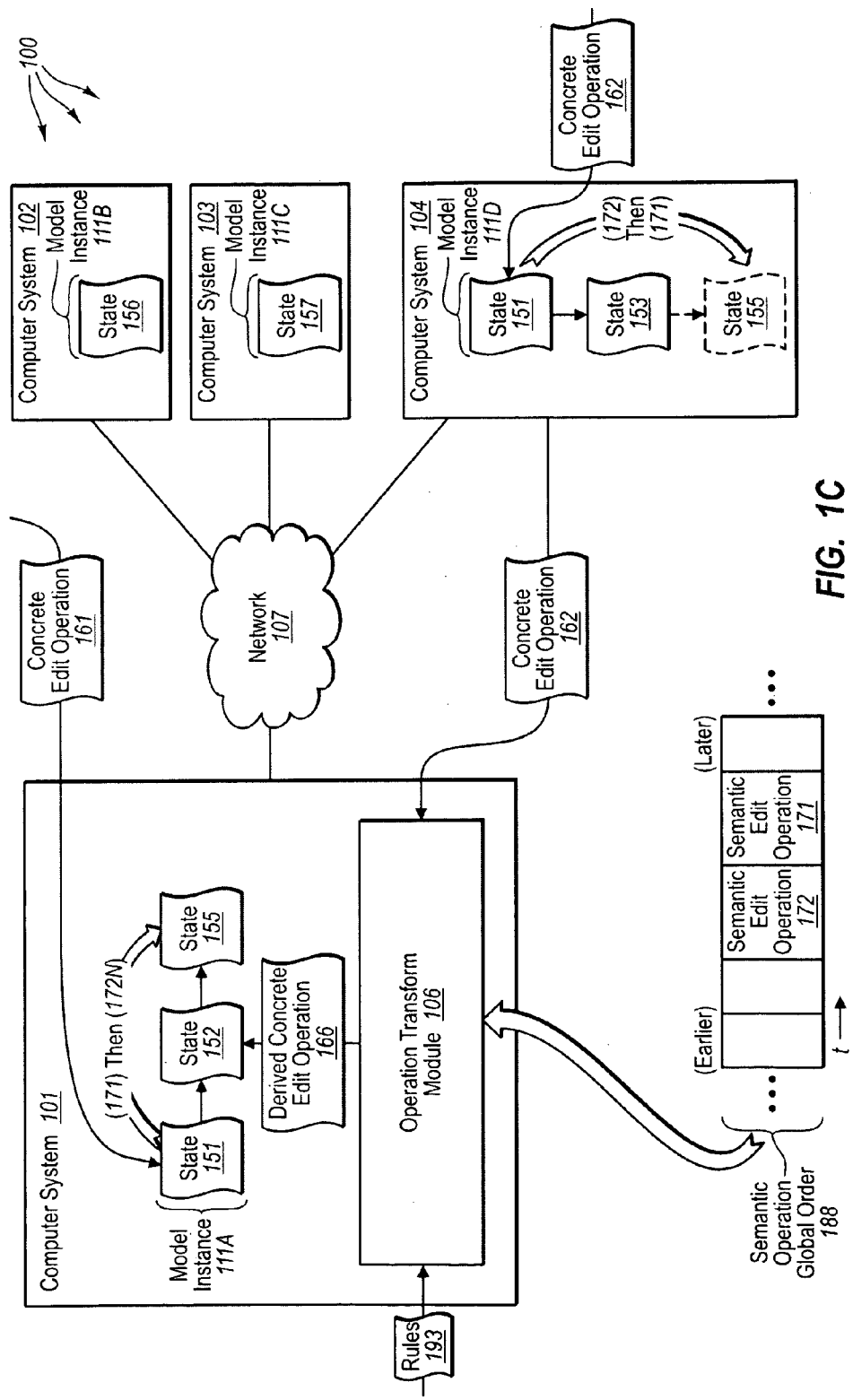
Figure 2C:
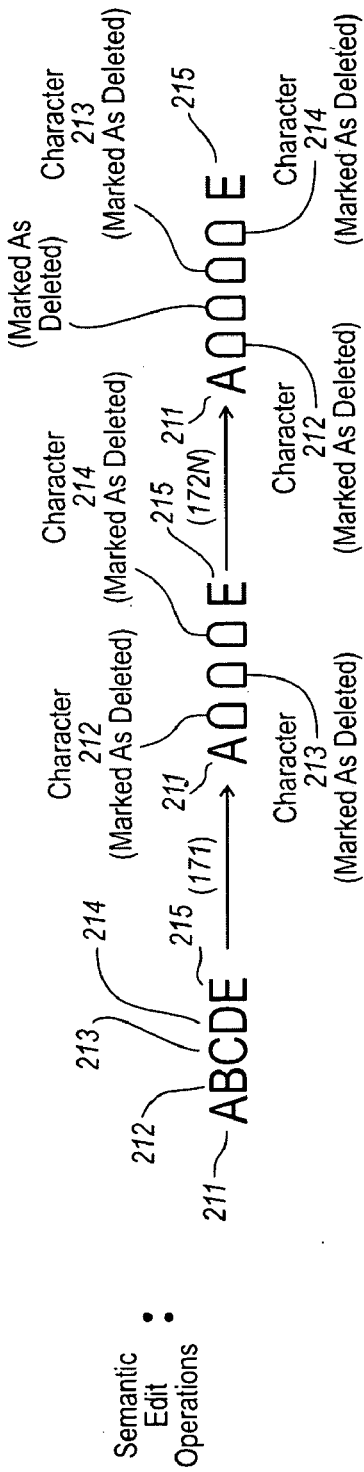
Figure 2C:
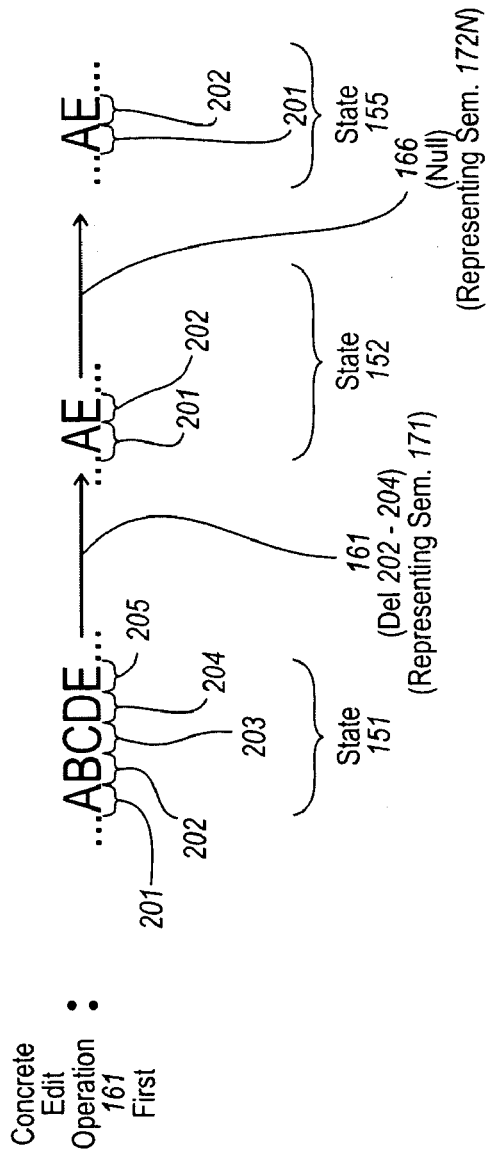

FIGS. 1C and 2C represent a second example of the received order of concrete operations not in accordance with a semantic operation global order. Global ordering 188 depicted in FIG. 1C differs from global ordering 108 depicted in FIGS. 1A and 1B. Referring now to FIGS. 1C and 2C, computer system can receive concrete edit operation 161 prior to receiving concrete edit operation 162. Concrete edit operation 161 can have originally been applied at a computer system participating in the collaborative editing of model 111. Concrete edit operation 161 can have been applied to an instance of model 111 when the instance of model 111 was in state 151. The application of concrete edit 161 to state 151 of the model instance represents semantic edit 171.

Computer system 101 can apply concrete edit 161 to model instance 111A to edit model instance 111A. Application of concrete edit operation 161 causes model instance 111A to transition to state 152. Application of concrete edit operation 161 to model instance 111A also represents the application of semantic edit 171 to model instance 111A (since model 111A was in state 151 when concrete edit 161 was applied).

Referring to FIG. 2C, model instance 111A and 111B can equal "ABCDE" in state 151. Semantic operation 171 indicates that characters 212 through 214 inclusive are to be deleted. Semantic operation 172 indicates that "X" is to be inserted before character 213. Thus, semantic operation 171 causes characters 212, 213, and 214 to be "marked as deleted".

Concrete edit operation 161 can indicate that character positions 202 through 204 are to be deleted. Computer system 101 can apply concrete edit operation 161 to indicate deletion of 'B', 'C', and 'D' (the characters in character positions 202, through 204). Thus, application of concrete edit operation 161 causes model 111A to transition to state 152, including "A" at position 201 and "E" at position 202. Computer system 101 can receive concrete edit operation 162 from computer system 104 subsequent to applying concrete edit 161 to model instance 111A. Concrete edit operation 162 was originally applied to model instance 111B when model 111B was in state 151 (and thus lacked knowledge of concrete edit operation 161). Application of concrete edit 162 to model instance 111B represents application of semantic edit 172 to model instance 111B (since model 111B was in state 151 when concrete edit 162 was applied).

Computer system 101 can determine that semantic edit operation 172 is before semantic edit operation 171 in semantic operation global order 188. However, the application of concrete edit operation 161 to model instance 111A (in state 151) represents that semantic edit operation 171 was already applied. Accordingly, rules 193 can implicitly reflect the identification of an appropriate semantic edit operation to compensate for the prior application of concrete edit operation 161. For example, rules 193 can identify semantic operation 172N. Semantic operation 172N can have properties such that 171;172N=172;171. Thus, semantic edit operation 171 followed by semantic edit operation 172N causes "ABCDE" to become "AE".

Rules 193 can utilize virtually any level of reasoning that can be represented in code or other executable instructions to implicitly or expressly identify semantic operation 172N. For example, rules 193 can include one or more of: heuristic algorithms, artificial intelligence, and expert systems to identify a semantic edit operation having the properties of semantic edit operation 172N. Rules 193 can then be followed to transform concrete edit operation 162 to derive concrete edit operation 164. Concrete edit operation 164 represents semantic edit operation 172N.

Computer system 101 can then apply derived concrete edit operation 166 to model instance 111A in state 152. Application of derived concrete edit operation 166 causes model instance 111A to transition to state 155. Application of derived concrete edit operation 166 also appropriately reflects the collaborative editing of model 111 in accordance with semantic operation global ordering 188. Adhering to semantic operation global ordering 188 increases the likelihood of the received concrete edit operations 161 and 162 causing model instance 111A to transition into the same state as instances of the model at the one or more other computer systems. For example, computer system 101 and 104 both transition to state 155.

Referring again to FIG. 2C, semantic operation 172N can insert tombstone 266 to represent the 'X' that in a sense was deleted before it was inserted (different from inserting 'X' before character 213). Accordingly, semantic edit 171 followed by semantic edit 172N results in "AE".

Thus, derived concrete edit operation 166 can appear to a user as a null operation. Application of derived concrete edit operation 166 causes model 111A to transition to state 155, including "A" at position 201 and "E" at position 202.

Figure 1D:
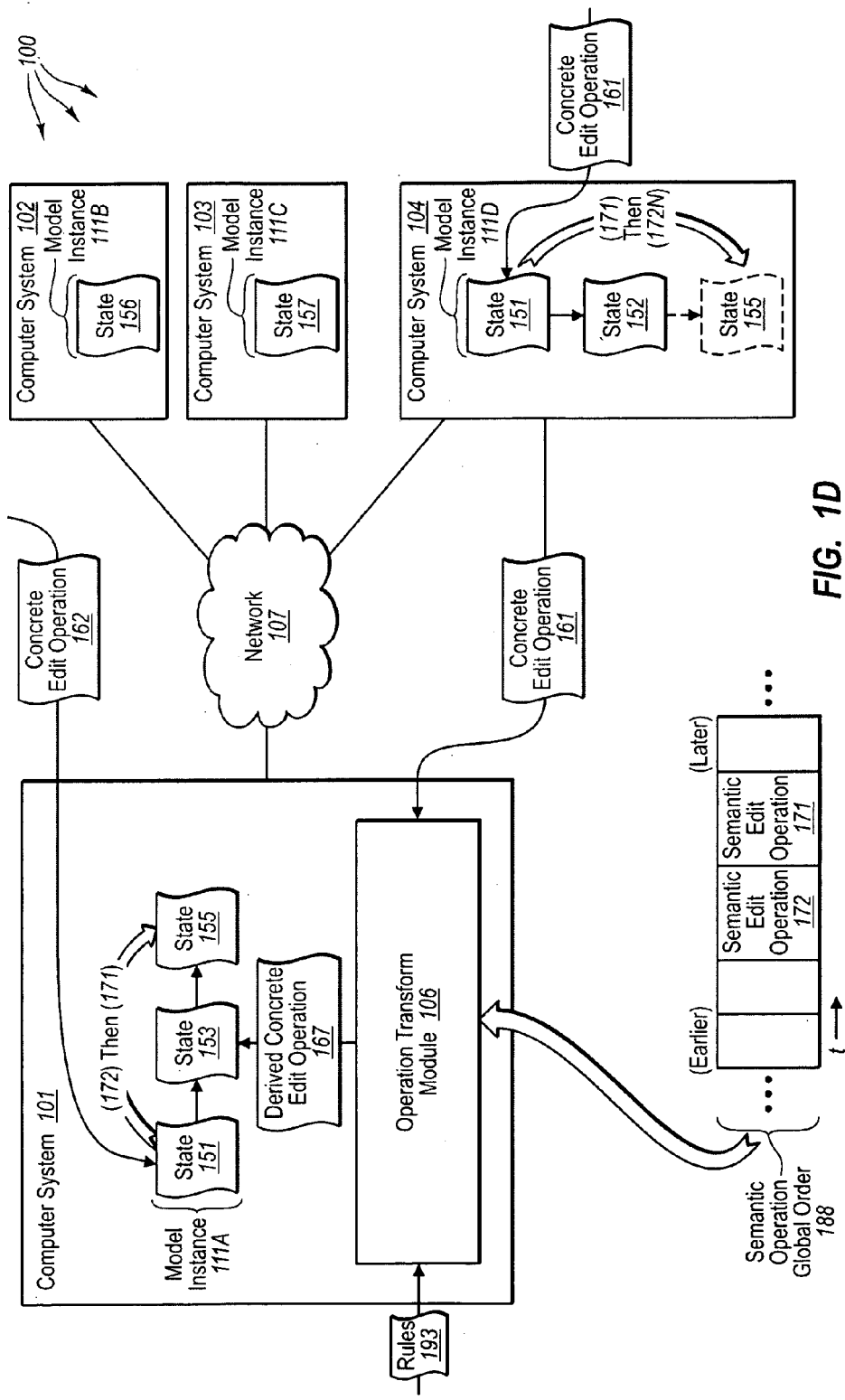
Figure 2D:
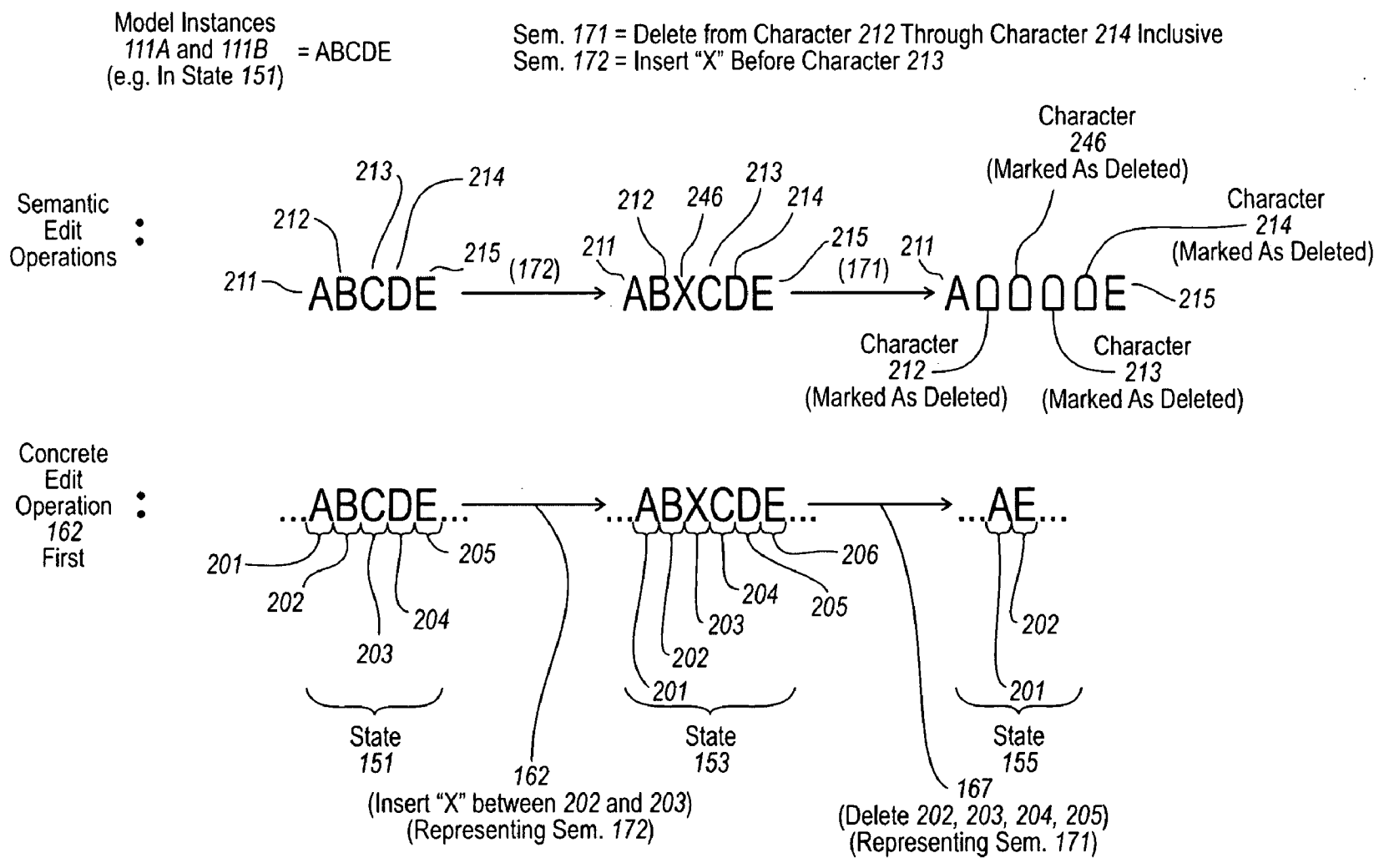

FIGS. 1D and 2D represent a second example of the received order of concrete operations in accordance with a semantic operation global order. Referring now to FIGS. 1D and 2D, computer system 101 can receive concrete edit operation 162. Concrete edit operation 162 can have originally been applied at a computer system participating in the collaborative editing of model 111. Concrete edit operation 162 can have been applied to an instance of model 111 when the instance of model 111 was in state 151. The application of concrete edit 162 to state 151 of the model instance represents semantic edit 172.

Computer system 101 can apply concrete edit 162 to model instance 111A to edit model instance 111A. Application of concrete edit operation 162 causes model instance 111A to transition to state 153. Application of concrete edit operation 162 to model instance 111A also represents the application of semantic edit 172 to model instance 111A (since model 111A was in state 151 when concrete edit 162 was applied).

Referring to FIG. 2D, semantic operation 171 indicates that characters 212 through 214 inclusive are to be deleted. Semantic operation 172 indicates that "X" is to be inserted before character 213. Semantic operation 172 causes character 246 'X' to be inserted before character 213 'C'.

Concrete edit operation 162 indicates that 'X' is to be inserted between 202 and 203. Computer system 101 can apply concrete edit operation 162 to insert 'X' between positions 202 and 203. As a result, 'X' assumes position 203, and 'C', 'D', and 'E' are moved to the positions 204, 205, and 206 respectively. Thus, application of concrete edit operation 162 causes model 111A to transition to state 153, "ABXCDE".

Computer system 101 can receive concrete edit operation 161 from computer system 104 subsequent to applying concrete edit 162 to model instance 111A. Concrete edit operation 161 was originally applied to model instance 111B when model 111B was in state 151 (and thus lacked knowledge of concrete edit operation 162). Application of concrete edit 161 to model instance 111B represents application of semantic edit 171 to model instance 111B (since model 111B was in state 151 when concrete edit 161 was applied).

Computer system 101 can determine that semantic edit operation 172 is before semantic edit operation 171 in semantic operation global order 188.

Operation transform module 106 can follow rules 193 to transform concrete edit operation 161 into derived concrete edit operation 167 to apply to model instance 111A. Rules 193 can implicitly reflect the understanding that the application of concrete edit operation 162 to model instance 111A (in state 151) represented semantic edit operation 172. Rules 193 can then refer to semantic operation global order 188 to determine that semantic edit operation 171 follows semantic operation 172.

Computer system 101 can apply derived concrete edit operation 167 to model instance 111A in state 153. Application of derived concrete edit operation 167 causes model instance 111A to transition to state 155. Application of derived concrete edit operation 167 also appropriately reflects the collaborative editing of model 111 in accordance with semantic operation global ordering 188. Adhering to semantic operation global ordering 188 increases the likelihood of the received concrete edit operations 162 and 161 causing model instance 111A to transition into the same state as instances of the model at the one or more other computer systems. For example, computer systems 101 and 104 both transition to state 155.

Referring again to FIG. 2D, semantic operation 171 indicates that characters 212 through 214 inclusive are to be deleted. Representing the application of semantic operation 171 would result in characters 212, 246, 213, and 214 being marked as deleted. Thus, semantic edit 172 followed by semantic edit 171 results in "AE".

Derived concrete edit operation 167 can indicate that character positions 202 through 205 are to be deleted. Computer system 101 can apply derived concrete edit operation 167 to indicate deletion of 'B', 'X', 'C', and 'D' (the characters in character positions 202 through 205). Thus, application of derived concrete edit operation 167 causes model 111A to transition to state 155, including "A" at position 201 and "E" at position 202.

Accordingly, embodiments of the invention increase the likelihood that all sites collaboratively editing a model end up in the same state as if applying all of the semantic edit operations in a global order. Thus, user intention can be preserved when different copies of the same data are independently edited at different locations. User intent can be preserved without centralized locking or other coordination. Thus, modifications to each copy of the data are appropriately reflected in all other copies of the data such that all copies end up in essentially the same state. Embodiments of the invention can be used in collaborative editing as well as data replication systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system communicatively coupled to one or more other computer systems, the computer system and each of the one or more other computer systems collaboratively editing a model, collaborative editing of the model including individually editing local instances of the model at any of the computer systems in accordance with the intent of a corresponding user at any of the computer systems, a method for preserving the intent of an edit entered at one of other computer systems when implementing the edit at the computer system, the method comprising:

an act of the computer system receiving a first concrete edit operation, the first concrete edit operation originally applied to a first instance of the model when the first instance of the model was in a specified state, the combination of the first concrete edit operation as applied to the first instance of the model in the specified state representing a first semantic edit operation to the model;

an act of the computer system applying the received first concrete edit operation to a local instance of the model at the computer system to edit the local instance of the model;

an act of the computer system receiving a second concrete edit operation from one of the other computer systems subsequent to applying the first concrete edit operation to the local instance of the model, the second concrete edit operation originally applied to a second instance of the model when the second instance of the model was a state that lacked knowledge of the first edit, the combination of the second concrete edit operation as applied to the second instance of the model in the specified state representing a second semantic edit operation to the model;

an act of determining the position of the first semantic edit operation relative to the position of the second semantic edit operation in a global ordering of semantic edit operations for collaboratively editing the model;

an act of appropriately transforming the received second concrete edit operation into a derived second concrete edit operation to apply to the local instance of model at the computer system based on the determined position of the first semantic edit operation relative to the position of the second semantic edit operation in a global ordering; and an act of the computer system applying the derived second concrete edit operation to the local instance of the model to appropriately reflect the collaborative editing of the model in accordance with the global ordering of semantic operations so as to increase the likelihood of the received first and second concrete edit operations causing the local instance of the model to transition into the same state as instances of the model at the one or more other computer systems.

2. The method as recited in claim 1, wherein the act of the computer system applying the received first concrete edit operation to a local instance of the model comprises an act of the computer system applying a concrete edit to one of: a text string, a property bag, and a tree structure.

3. The method as recited in claim 1, wherein the act of the computer system determining the position of the first semantic edit operation relative to the position of the second semantic edit operation in a global ordering comprises an act of the computer system determining that the first semantic edit operation is before the second semantic edit operation in the global ordering.

4. The method as recited in claim 3, wherein the act of appropriately transforming the received second concrete edit operation into a derived second concrete edit operation to apply to the local instance of model comprises an act of transforming the received second concrete edit operation into a derived second concrete operation based on the first semantic edit operation being before the second semantic edit operation in the global ordering.

5. The method as recited in claim 4, wherein the act of appropriately transforming the received second concrete edit operation into a derived second concrete edit operation to apply to the local instance of model comprises an act of referring to predefined rules that implicitly or expressly reflect reasoning with respect to semantic edit operation representing the concrete edit operation.

6. The method as recited in claim 1, wherein the act of the computer system determining the position of the first semantic edit operation relative to the position of the second semantic edit operation in a global ordering comprises an act of the computer system determining that the first semantic edit operation is after the second semantic edit operation in the global ordering.

7. The method as recited in claim 6, wherein the act of appropriately transforming the received second concrete edit operation into a derived second concrete edit operation to apply to the local instance of model comprises an act of transforming the received second concrete edit operation to a derived second concrete operation based on the first semantic edit operation being after the second semantic edit operation in the global ordering.

8. The method as recited in claim 7, wherein an act of transforming the received second concrete edit operation to a derived second concrete operation based on the first semantic edit operation being after the second semantic edit operation in the global ordering comprises:

an act of operation transform rules implicitly or expressly reflecting reasoning with respect to a new semantic edit operation having a property such that the applying the first semantic edit operation followed by the new semantic edit operation has the same effect as applying the second semantic operation followed by the first semantic operation; and an act of transforming the second concrete edit operation into a new concrete edit operation, the new concrete edit operation, as applied to the instance of the local instance of model after application of the first concrete edit operation, representing the new semantic edit operation.

9. The method as recited in claim 8, wherein the act of applying the derived second concrete edit operation to the instance of the model at the computer system to appropriately reflect the collaborative editing of the model in accordance with the global ordering of semantic operations comprises an act of applying the new concrete edit operation to the instance of the model at the computer system to compensate for applying the first concrete operation prior to the second concrete operation such that the local instance of the model conforms with the global ordering of the semantic edit operations even though the first concrete operation was applied prior to the second concrete operation.

10. A computer program product for use at a computer system, the computer system communicatively coupled to one or more other computer systems, the computer system and each of the one or more other computer systems collaboratively editing a model, collaborative editing of the model including individually editing local instances of the model at any of the computer systems in accordance with the intent of a corresponding user at any of the computer systems, the computer program product for implementing a method for preserving the intent of an edit entered at one of other computer systems when implementing the edit at the computer system, the computer program product comprising one or more physical storage media having stored thereon computer-executable instructions that, when executed at a processor cause the computer system to perform the method including the following:

receive a first concrete edit operation, the first concrete edit operation originally applied to a first instance of the model when the first instance of the model was in a specified state, the combination of the first concrete edit operation as applied to the first instance of the model in the specified state representing a first semantic edit operation to the model;

apply the received first concrete edit operation to a local instance of the model at the computer system to edit the local instance the model;

receive a second concrete edit operation from one of the other computer systems subsequent to applying the first concrete edit operation to the local instance of the model, the second concrete edit operation originally applied to a second instance of the model when the second instance of the model was a state that lacked knowledge of the first edit, the combination of the second concrete edit operation as applied to the second instance of the model in the specified state representing a second semantic edit operation to the model;

determine the position of the first semantic edit operation relative to the position of the second semantic edit operation in a global ordering of semantic edit operations for collaboratively editing the model;

transform the received second concrete edit operation into a derived second concrete edit operation to apply to the local instance of model at the computer system based on the determined position of the first semantic edit operation relative to the position of the second semantic edit operation in a global ordering; and apply the derived second concrete edit operation to the local instance of the model to appropriately reflect the collaborative editing of the model in accordance with the global ordering of semantic operations so as to increase the likelihood of the received first and second concrete edit operations causing the local instance of the model to transition into the same state as instances of the model at the one or more other computer systems.

11. The computer program product as recited in claim 10, wherein computer-executable instructions that, when executed, cause the computer system to determine the position of the first semantic edit operation relative to the position of the second semantic edit operation in a global ordering comprise computer-executable instructions that, when executed, cause the computer system to determine that the first semantic edit operation is before the second semantic edit operation in the global ordering.

12. The computer program product as recited in claim 11, wherein the computer-executable instructions that, when executed, cause the computer system to transform the received second concrete edit operation into a derived second concrete edit operation to apply to the local instance of model comprise computer-executable instructions that, when executed, cause the computer system to transform the received second concrete edit operation into a derived second concrete operation based on the first semantic edit operation being before the second semantic edit operation in the global ordering.

13. The computer program product as recited in claim 11, wherein computer-executable instructions that, when executed, cause the computer system to transform the received second concrete edit operation into a derived second concrete edit operation to apply to the local instance of model comprise computer-executable instructions that, when executed, cause the computer system to refer to predefined rules indicative of how to convert a semantic edit operation to a concrete edit operation.

14. The computer program product as recited in claim 10, wherein computer-executable instructions that, when executed, cause the computer system to determine the position of the first semantic edit operation relative to the position of the second semantic edit operation in a global ordering comprise computer-executable instructions that, when executed, cause the computer system to determine that the first semantic edit operation is after the second semantic edit operation in the global ordering.

15. The computer program product as recited in claim 14, wherein computer-executable instructions that, when executed, cause the computer system to transform the received second concrete edit operation into a derived second concrete edit operation to apply to the local instance of model comprise computer-executable instructions that, when executed, cause the computer system to transform the received second concrete edit operation to a derived second concrete operation based on the first semantic edit operation being after the second semantic edit operation in the global ordering.

16. The computer program product as recited in claim 15, wherein computer-executable instructions that, when executed, cause the computer system to transform the received second concrete edit operation to a derived second concrete operation based on the first semantic edit operation being after the second semantic edit operation in the global ordering comprise computer-executable instructions that, when executed, cause the computer system to:

identify a new semantic edit operation having a property such that the applying the first semantic edit operation followed by the new semantic edit operation has the same effect as applying the second semantic operation followed by the first semantic operation; and transform the second concrete edit operation into a new concrete edit operation, the new concrete edit operation, as applied to the instance of the local instance of model after application of the first concrete edit operation, representing the new semantic edit operation.

17. The computer program product as recited in claim 16, wherein computer-executable instructions that, when executed, cause the computer system to identify a new semantic edit operation comprise computer-executable instructions that, when executed, cause the computer system to refer to predefined rules indicative of how to identify semantic edit operations with specified properties.

18. The computer program product as recited in claim 16, wherein computer-executable instructions that, when executed, cause the computer system to apply the derived second concrete edit operation to the instance of the model at the computer system to appropriately reflect the collaborative editing of the model in accordance with the global ordering of semantic operations comprise computer-executable instructions that, when executed, cause the computer system to apply the new concrete edit operation to the instance of the model at the computer system to compensate for applying the first concrete operation prior to the second concrete operation such that the local instance of the model conforms with the global ordering of the semantic edit operations even though the first concrete operation was applied prior to the second concrete operation.

19. A computer system, the computer system comprising:
one or more processors;
system memory;
one or more physical storage media having stored thereon computer-executable instructions that, when executed at a processor, cause the computer system to perform the following:
receive a first concrete edit operation, the first concrete edit operation originally applied to a first instance of the model when the first instance of the model was in a specified state, the combination of the first concrete edit operation as applied to the first instance of the model in the specified state representing a first semantic edit operation to the model; and
apply the received first concrete edit operation to a local instance of the model at the computer system to edit the local instance the model;
wherein the one or more physical storage media also have stored thereon computer-executable instructions representing an operation transform module, the operation transform module configured to:
receive a second concrete edit operation from another computer systems subsequent to applying the first concrete edit operation to the local instance of the model, the second concrete edit operation originally applied to a second instance of the model when the second instance of the model was a state that lacked knowledge of the first edit, the combination of the second concrete edit operation as applied to the second instance of the model in the specified state representing a second semantic edit operation to the model;

determine the position of the first semantic edit operation relative to the position of the second semantic edit operation in a global ordering of semantic edit operations for collaboratively editing the model;

when it is determined that the first semantic edit operation is before the second semantic edit operation in the global ordering:
  transform the received second concrete edit operation into a derived concrete operation based on the first semantic edit operation being before the second semantic edit operation in the global ordering;

when it is determined that the first semantic edit operation is after the second semantic edit operation in the global ordering:
  transform the received second concrete edit operation to a derived concrete operation based on the first semantic edit operation being after the second semantic edit operation in the global ordering, including:
    identifying a new semantic edit operation having a property such that the applying the first semantic edit operation followed by the new semantic edit operation has the same effect as applying the second semantic operation followed by the first semantic operation; and
    transforming the second concrete edit operation into the derived edit operation, the derived concrete edit operation, as applied to the instance of the local instance of model after application of the first concrete edit operation, representing the new semantic edit operation; and apply the derived concrete edit operation to a local instance of the model to appropriately reflect the collaborative editing of the model in accordance with the global ordering of semantic operations so as to increase the likelihood of the received first and second concrete edit operations causing the local instance of the model to transition into the same state as instances of the model at the one or more other computer systems.

20. The system as recited in claim 19, wherein the model is selected from among one of: a text string, a property bag, and a tree structure.

* * * * *